(12) United States Patent
Hashii et al.

(10) Patent No.: US 9,672,450 B2
(45) Date of Patent: Jun. 6, 2017

(54) IMAGE RECORDING APPARATUS AND CONTROL METHOD THEREFOR

(71) Applicant: CANON KABUSHIKI KAISHA, Tokyo (JP)

(72) Inventors: Yusuke Hashii, Tokyo (JP); Yugo Mochizuki, Kawasaki (JP); Kouta Murasawa, Yokohama (JP); Shinichi Miyazaki, Kawasaki (JP); Mayuko Yamagata, Inagi (JP); Akitoshi Yamada, Yokohama (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/055,465

(22) Filed: Feb. 26, 2016

(65) Prior Publication Data

US 2016/0275380 A1    Sep. 22, 2016

(30) Foreign Application Priority Data

Mar. 17, 2015    (JP) ................. 2015-053958

(51) Int. Cl.
*G06K 15/10* (2006.01)
*G06K 15/02* (2006.01)

(52) U.S. Cl.
CPC ....... *G06K 15/105* (2013.01); *G06K 15/1857* (2013.01)

(58) Field of Classification Search
CPC ................ G06K 15/105; H04N 1/04
See application file for complete search history.

(56) References Cited

U.S. PATENT DOCUMENTS

| | | | |
|---|---|---|---|
| 6,788,434 B1 | 9/2004 | Kanematsu et al. |
| 7,199,897 B2 | 4/2007 | Nomizu |
| 7,251,046 B2 | 7/2007 | Mochizuki et al. |
| 8,179,546 B2 | 5/2012 | Aichi et al. |
| 8,934,134 B2 | 1/2015 | Ono et al. |
| 8,976,411 B2 | 3/2015 | Yamada et al. |
| 9,013,750 B2 | 4/2015 | Yamada et al. |

(Continued)

FOREIGN PATENT DOCUMENTS

| | | |
|---|---|---|
| JP | 3935335 B2 | 6/2007 |
| JP | 4479230 B2 | 6/2010 |

*Primary Examiner* — Alessandro Amari
*Assistant Examiner* — Roger W Pisha, II
(74) *Attorney, Agent, or Firm* — Fitzpatrick, Cella, Harper & Scinto

(57) ABSTRACT

An image recording apparatus according to this invention analyzes image data to be printed, and generates sequence information for defining the moving range of each scanning motion of a recording head and the conveyance amount of a recording medium. The apparatus divides a recording area defined by the generated sequence information into areas so that the processing amounts of a plurality of processing units capable of parallelly executing processes are equal to each other, distributes data of the divided areas to the processing units, and causes each of the processing units to generate recording image data. The apparatus performs recording by controlling driving and a scanning motion of the recording head and conveyance of the recording medium based on the recording image data obtained by the processing units.

17 Claims, 10 Drawing Sheets

(56) References Cited

U.S. PATENT DOCUMENTS

| | | | |
|---|---|---|---|
| 2010/0271414 A1* | 10/2010 | Kaizu | B41J 2/2139 347/16 |
| 2011/0001992 A1 | 1/2011 | Kajihara et al. | |
| 2012/0176644 A1* | 7/2012 | Takeuchi | B41J 29/38 358/1.15 |
| 2013/0194341 A1* | 8/2013 | Ishizuka | B41J 11/0095 347/17 |
| 2015/0131128 A1 | 5/2015 | Yamada et al. | |

* cited by examiner

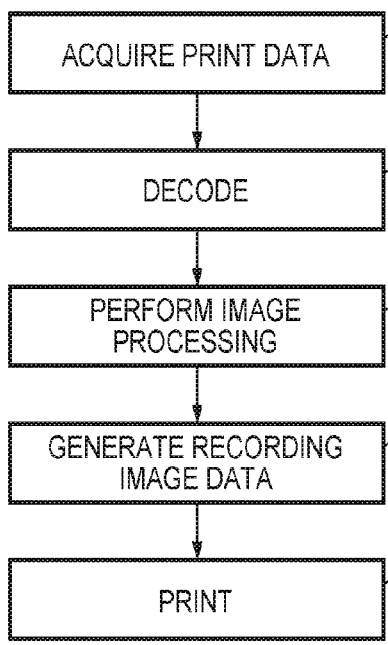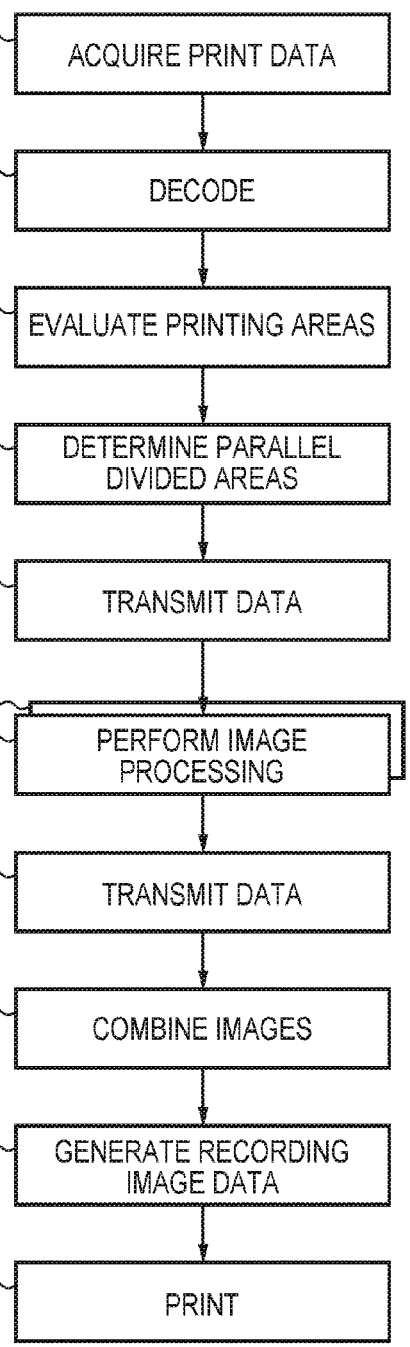

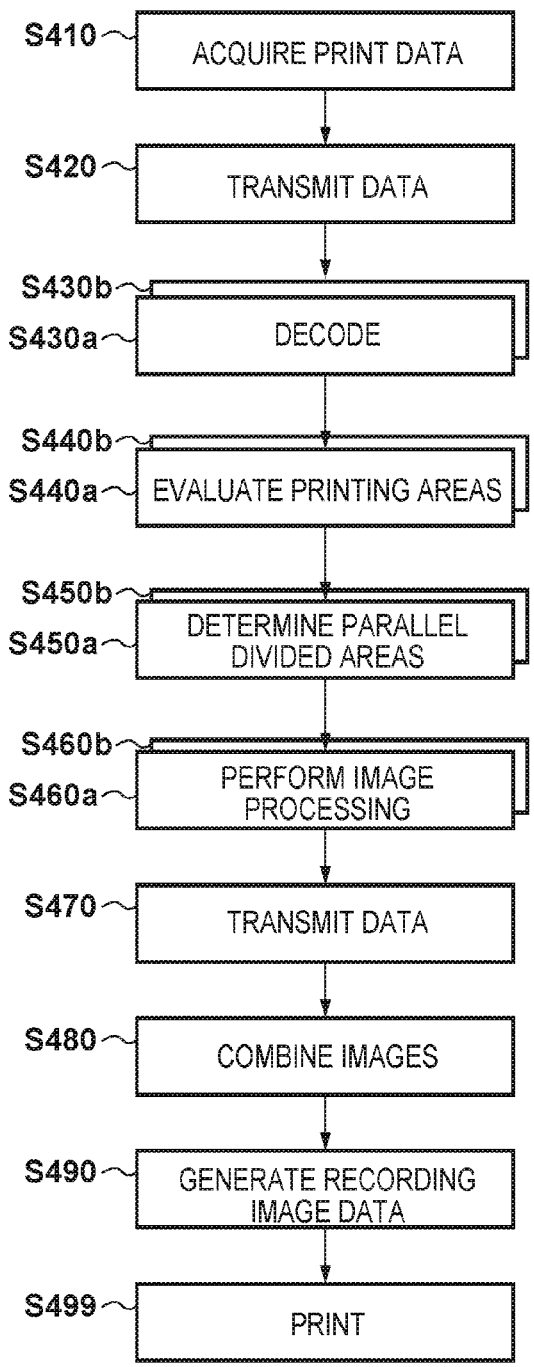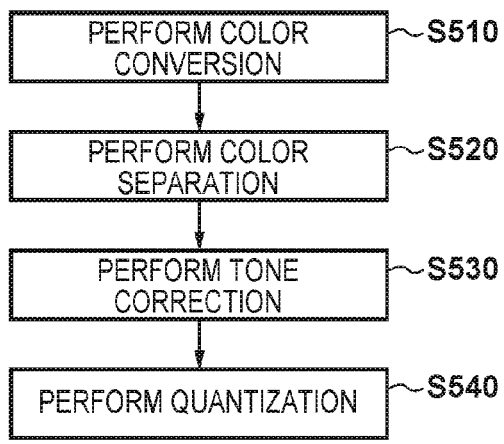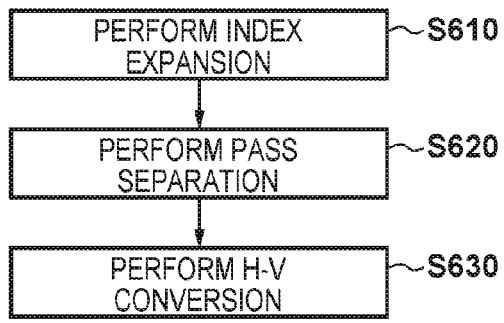

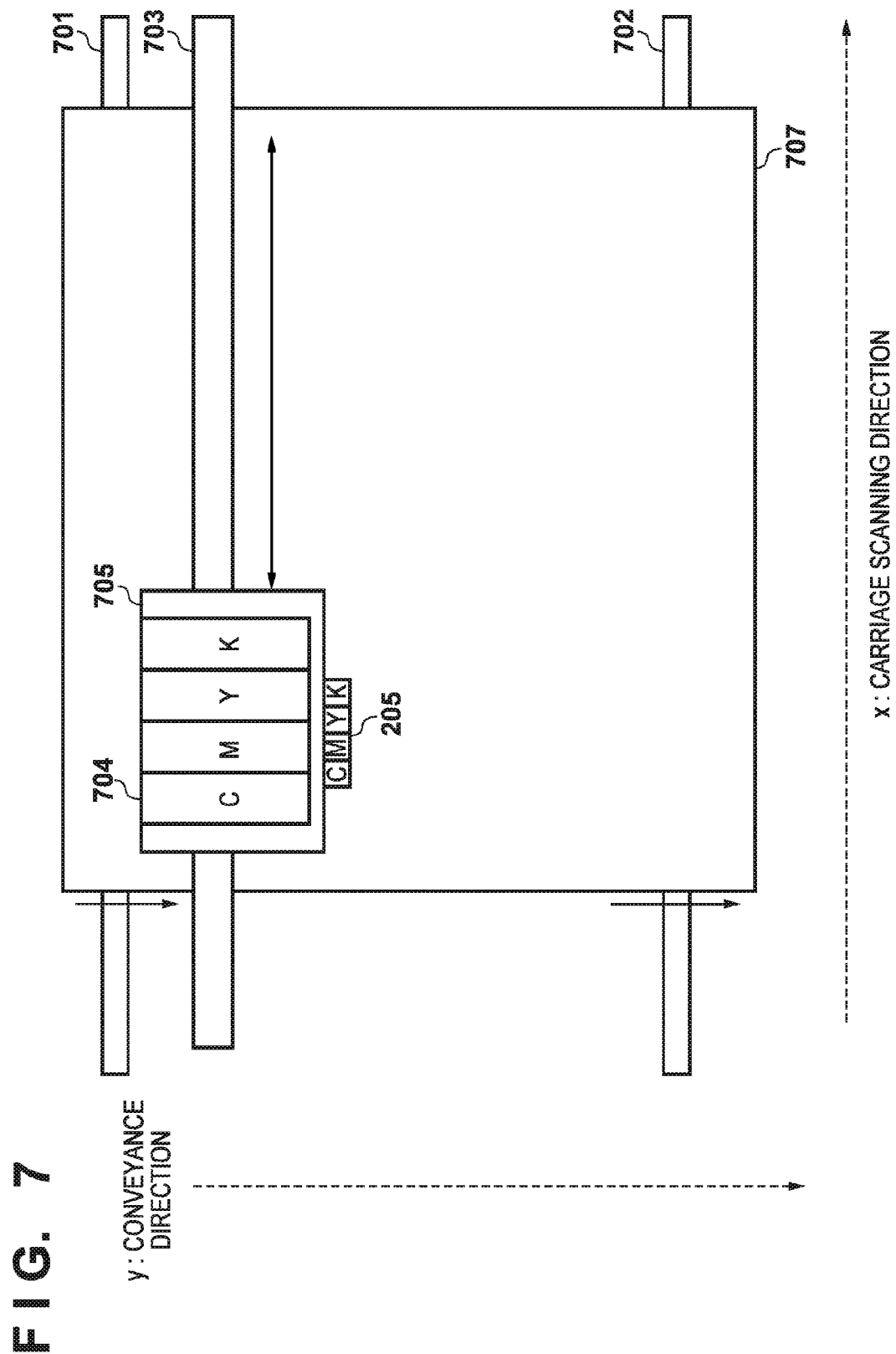

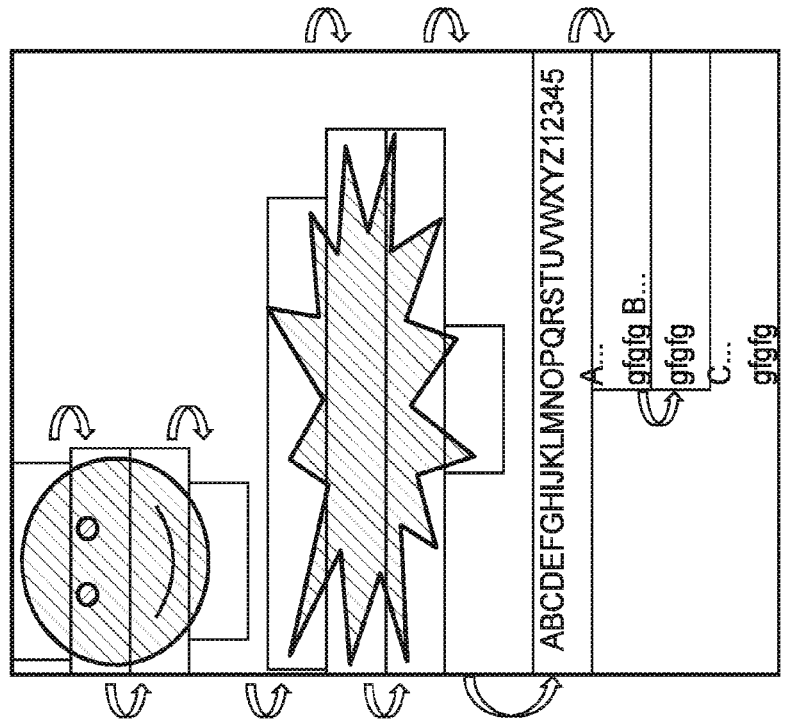
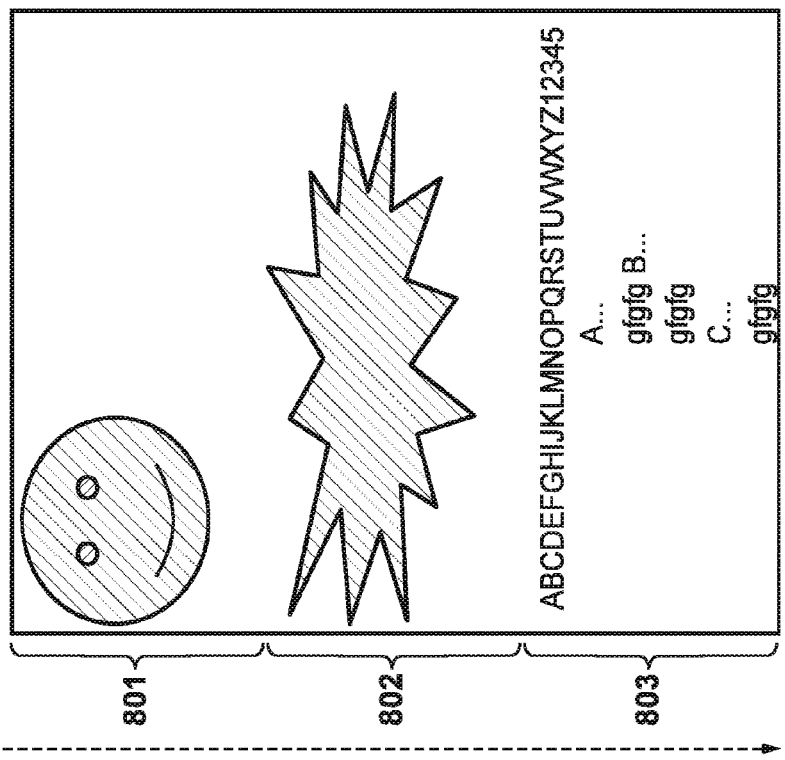

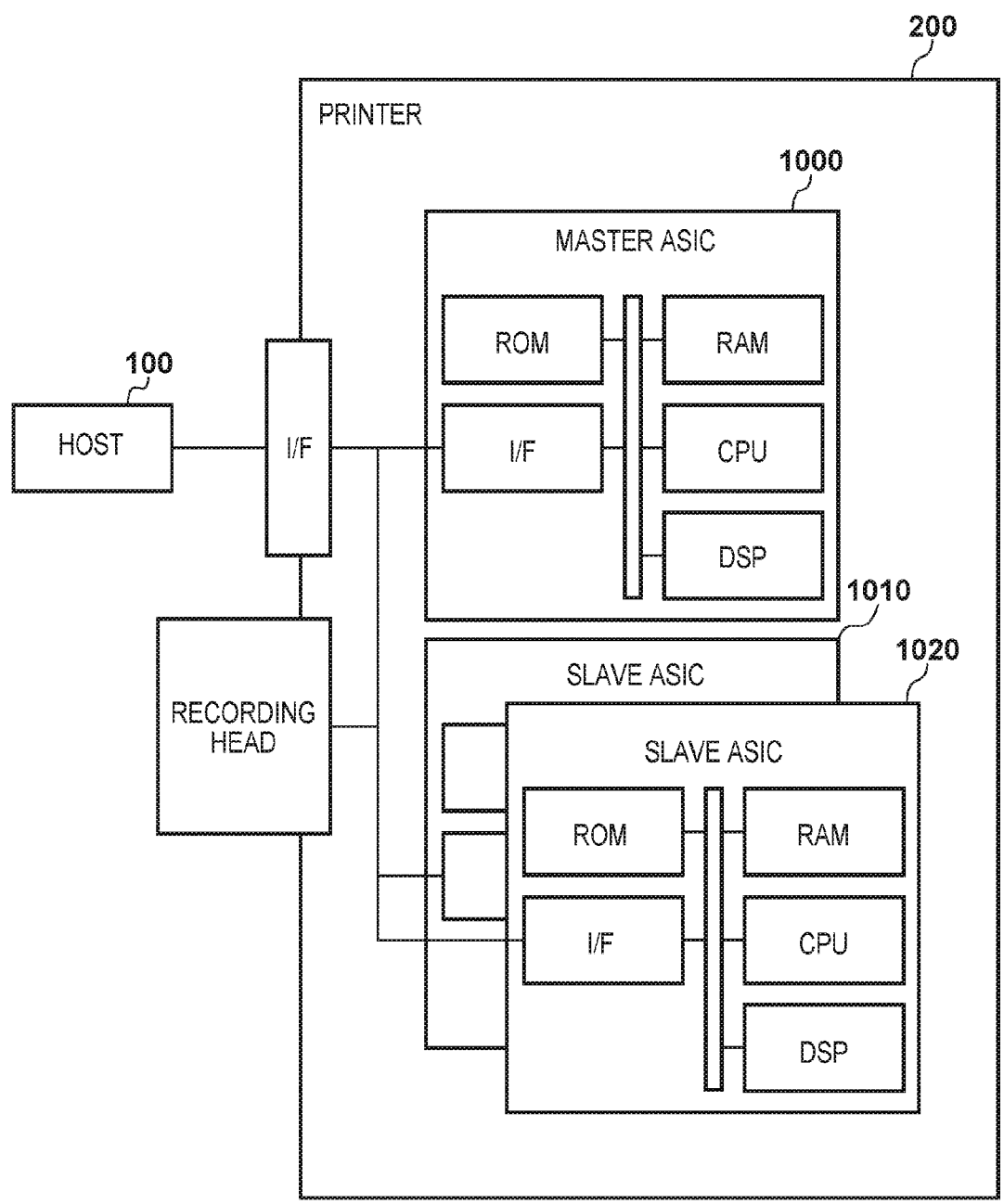
F I G. 10

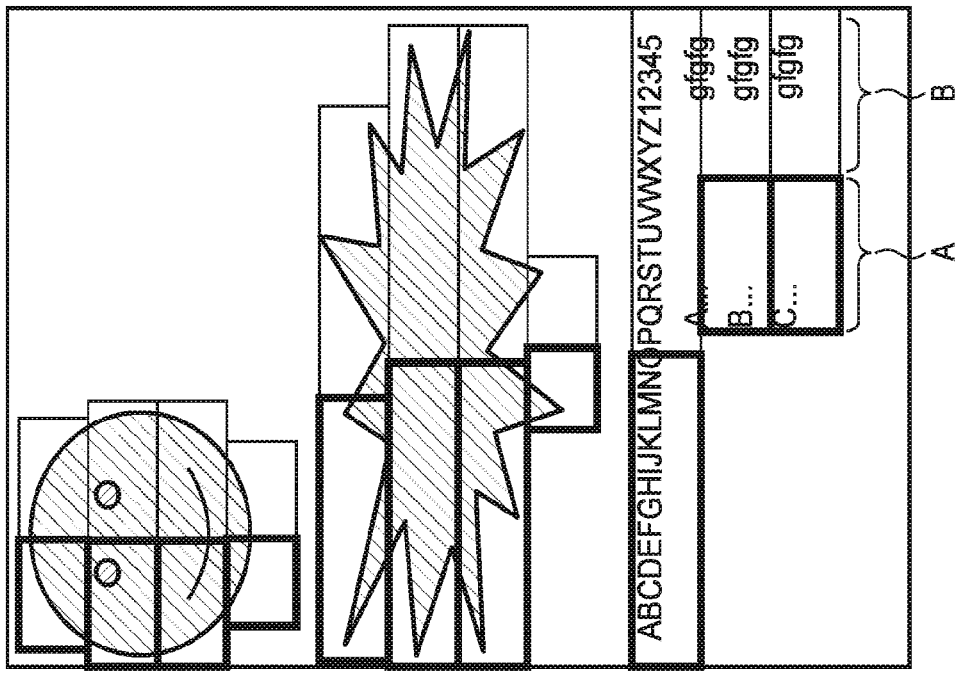
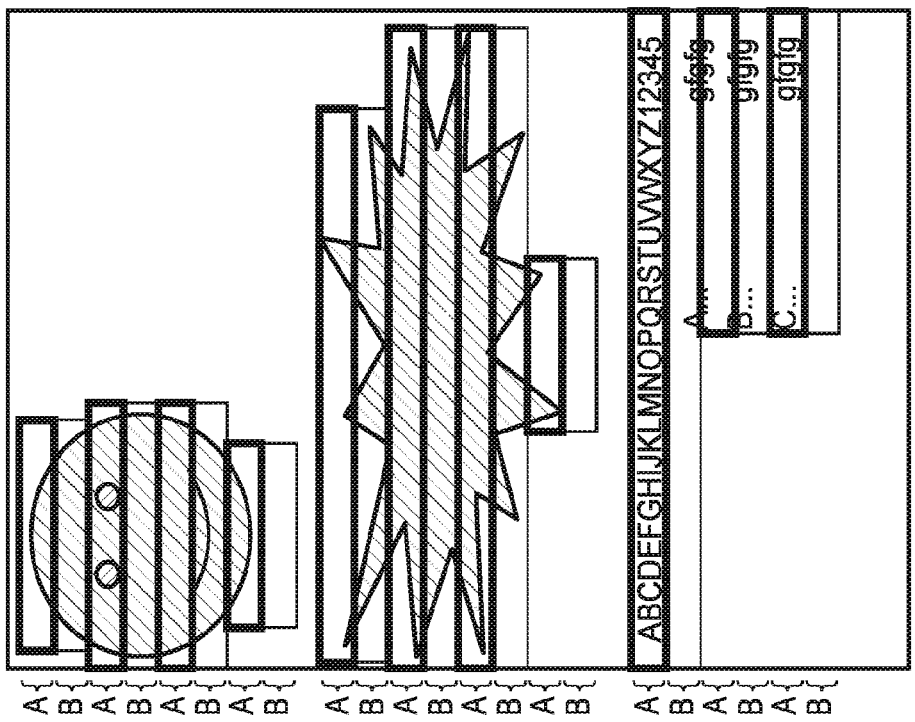

IMAGE RECORDING APPARATUS AND CONTROL METHOD THEREFOR

BACKGROUND OF THE INVENTION

Field of the Invention

The present invention relates to an image recording apparatus for executing printing by relatively scanning and moving a carriage incorporating a recording head with respect to a recording medium, and a control method for the image recording apparatus.

Description of the Related Art

In recent years, inkjet printers each for executing printing by discharging ink from a recording head have become widespread. More specifically, serial head inkjet printers each for executing printing by discharging ink from a recording head while scanning and moving a carriage incorporating the recording head, and feeding, using a paper feed mechanism, a paper sheet to be printed have become widespread as home printers and the like.

In consideration of the user convenience, the print speed is increasing year by year by increasing the number of nozzles of a recording head or increasing the carriage moving speed by allowing high-speed discharge.

Furthermore, there is known a technique of further increasing the speed of print processing by shortening the moving distance in a scanning direction of a carriage and controlling conveyance of a recording medium in accordance with the layout of an image to be printed (for example, Japanese Patent No. 4479230).

A photo, document, or the like is input to a PC and printed on a paper surface using an inkjet printer. It is common practice to process the photo as an image format file such as a JPEG file, and process the document as a page description language file such as a PDF file. When executing printing on the PC, an application program for instructing printing is used. A printer driver intervenes between the application program and the printer. Upon receiving a print instruction, the application program interprets a file to be printed, rasterizes information of a photo or document described in the file into a bitmap image, and transmits the bitmap image to the printer driver. Upon receiving the bitmap image, the printer driver generally performs print image processing such as scaling, color space conversion, color separation, tone correction, and quantization for the image to obtain data unique to the printer, and performs a procedure of transmitting the data to the printer.

In recent years, printers for accepting printing from various terminals such as a smartphone and tablet terminal are increasing. Many of these terminals cannot incorporate a printer driver. Therefore, such terminal directly transmits a JPEG file, a PDF file, or the like to be printed to a printer to execute printing. That is, recent printers have a function of performing the same processing as that executed by the printer driver of a general PC.

Consequently, as for recent printers, while the print speed is increasing, various processing loads imposed on the printer main body are also increasing. In particular, print image processing needs to perform calculation for all pixels to be printed, thereby imposing a very heavy processing load. To cope with the processing load, the printer incorporates an ASIC including dedicated image processing hardware and a CPU.

On the other hand, the manufacturing cost of an ASIC having these features is high, and a speedup range is limited. More particularly, a processing clock rate improvement range is limited by the physical factors of elements forming a logic circuit.

A CPU for a general PC has this tendency. In recent years, an approach for improving the throughput by using a multicore CPU (parallelization) instead of increasing the clock rate of the CPU has been adopted. In general, if a single high-speed processing device and a low-speed processing device are prepared in parallel, the necessary performance of the latter processing device is suppressed lower, and the cost of the overall apparatus becomes lower. This method is effective also in a printer, and there is an example in which parallelization is implemented using a plurality of ASICs (Japanese Patent No. 3935335).

However, if processes for respective colors are parallelized, the parallelization count is limited to, at most, the number of ink colors. As an extreme example, there is no room for parallelization in a monochrome print mode using only one K ink color.

As another method of parallelizing image processes, an area to be processed may be divided and the respective divided areas may be parallelly processed. For example, by dividing an A4 paper surface into 4×4 rectangular areas, 16-parallel processing can theoretically be performed for an image on the A4 paper surface. However, such method of dividing an area to be processed is difficult to be applied to a serial head inkjet printer.

As a feature caused by the "serial head" of the serial head inkjet printer, even for the same image on the A4 paper surface, a processing sequence at the time of printing may largely be different depending on the layout of the image.

Consider, for example, a document of a layout shown in FIG. 8A. When this document is printed at a high speed by a printer incorporating a serial head, printing is executed by the scanning motion of the recording head in strip portions shown in FIG. 8B and conveyance of a recording paper sheet. This is because the scanning motion of a carriage is performed only in an area requiring printing without causing the head to scan the entire paper surface, and it is thus possible to shorten the total print time.

When performing such print processing, for example, while an upper portion 801 (an area in which a face is drawn) on the paper surface is printed, a print operation is performed for the left half area on the paper surface at about twice the normal speed. Consequently, while the upper portion 801 is printed, it is necessary to supply an image processing result to the recording head at twice the normal speed. On the other hand, while a center portion 802 (an area in which a balloon is drawn) on the paper surface is printed, a print operation is performed for the full width of the paper surface at the normal speed. Therefore, while the center portion 802 is printed, an image processing result is supplied to the recording head at the normal speed. Furthermore, while a lower portion 803 (an area in which characters are written) on the paper surface is printed, a print operation is performed for the right half area on the paper surface at about twice the normal speed. Consequently, while the lower portion 803 is printed, it is necessary to supply an image processing result to the recording head at twice the normal speed.

As described above, at the time of printing by an inkjet printer incorporating a serial head, the speed necessary to process each area on the paper surface is different depending on an image layout. Therefore, even if parallel processing is performed by simply dividing the paper surface into rectangles, an area on which a heavy processing load is locally imposed is undesirably generated, and it is thus impossible to take full advantage of parallelization.

More specifically, a case in which the image of FIG. 8A is divided into two areas shown in FIG. 9 to parallelize image processes is considered as a simple example.

The left half of the paper surface is indicated by area A and the right half of the paper surface is indicated by area B. Processing unit A takes charge of image processing for area A and processing unit B takes charge of image processing for area B. While an upper portion 901 (an area in which the face is written) on the paper surface is printed, the processing load concentrates on only processing unit A, and processing unit A needs to perform the processing at twice the normal speed. During this processing, there is no image to be processed by processing unit B, and thus the processing load is hardly imposed on processing unit B. In other words, parallelization produces no effects.

While a center portion 902 (an area in which the balloon is written) on the paper surface is printed, processing units A and B perform image processes by halving the processing load. Both of the processing units A and B performs the processing at the normal speed. The processing load is halved, as compared with a case in which one processing unit processes the same entire area. In other words, parallelization produces effects.

While a lower portion 903 (an area in which the characters are written) on the paper surface is printed, the processing load concentrates on only processing unit B, and processing unit B needs to perform the processing at twice the normal speed. During this processing, there is no image to be processed by processing unit A, and thus the processing load is hardly imposed on processing unit A. In other words, parallelization produces no effects.

In consideration of the above points, if processing units A and B parallelly execute the image processes on such parallelization basis, in order to guarantee the processing speed even when a heavy load is locally imposed, it is necessary to estimate twice the processing speed for each processing unit. Since twice the processing speed is estimated for a half the processing amount, each processing unit is required to have the normal processing speed.

That is, to guarantee the processing speed even under the worst conditions caused by an image layout, each processing unit is required to have the normal (non-parallel) processing speed even if parallelization is performed. As a result, a plurality of processing devices with the same cost as that of the normal (non-parallel) processing unit are prepared, and thus the cost advantage of parallelization cannot be obtained. In other words, if hardware performance is designed to be able to complete the processing within a given time for any layout, it becomes necessary to set an excessive throughput margin to cope with a case in which the load concentrates on a specific processing resource. As a result, the mounting cost of each processing resource may become high. In some cases, it is impossible to obtain a margin with the throughput of a circuit obtained in a practical manufacturing process.

If it is impossible to obtain a margin, the image processing may be delayed with respect to the print speed, and thus, for example, a scan stop time may be irregularly generated during a head scan. Generation of irregular stop times causes an irregular change in ink penetration conditions. As a result, a difference in ink penetration state between head scans may adversely affect the image quality due to color development unevenness, an image stripe, or the like.

As described above, in a printer incorporating a serial head, to preferably and efficiently implement parallelization by a plurality of processing units regardless of an image layout, it is necessary to calculate area division on demand in consideration of a head/paper feed sequence determined for each image to be printed. However, no such technique currently exists.

SUMMARY OF THE INVENTION

According to an aspect of the present invention, there is provided an image recording apparatus for printing an image on a recording medium by performing a scanning motion of a recording head in which a plurality of recording devices are arrayed, and relatively conveying the recording medium in accordance with the scanning motion in a direction intersecting a direction of the scanning motion, the apparatus comprising: a generation unit configured to generate, based on image data to be printed, sequence information indicating a moving range of each scanning motion of the recording head for each of a plurality of areas on the recording medium, whose positions in the intersecting direction are different; a plurality of processing units configured to parallelly execute processes of generating recording image data to be used for driving the recording head; a divided area determination unit configured to determine, based on the sequence information generated by the generation unit, for a plurality of divided areas obtained by dividing a recording area on the recording medium on which the recording head performs recording, divided areas respectively corresponding to the plurality of processing units so that the plurality of processing units perform the processes corresponding to the separate divided areas; a distribution unit configured to cause each of the plurality of processing units to generate recording image data by transmitting, to the plurality of processing units, data corresponding to the divided areas determined by the divided area determination unit in the image data to be printed; and a recording unit configured to perform recording by controlling driving and a scanning motion of the recording head and conveyance of the recording medium based on the recording image data obtained by the plurality of processing units.

According to the present invention, it is possible to implement parallel processing with high parallelism independent of an image layout to be printed, thereby implementing a low-end, high-speed image recording apparatus without degrading the image quality.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and , together with the description, serve to explain the principles of the invention.

FIG. 2 is a flowchart illustrating print processing at the time of individual processing in a conventional printer;

FIG. 3 is a flowchart illustrating print processing at the time of parallel processing in the printer according to the embodiment;

FIG. 4 is a flowchart illustrating print processing at the time of parallel processing in the printer according to the embodiment;

FIG. 5 is a flowchart illustrating image processing in the printer according to the embodiment;

FIG. 6 is a flowchart illustrating print data generation processing in the printer according to the embodiment;

FIG. 7 is a view showing the arrangement of the printer according to the embodiment;

FIGS. 8A and 8B are views for explaining a scan sequence in the printer;

FIG. 10 is a block diagram showing the apparatus arrangement of a printer when a plurality of ASICs are connected in the printer according to the embodiment;

FIG. 11 is a view showing parallelization division of an image according to the first embodiment;

FIG. 12 is a view showing parallelization division of an image according to the second embodiment;

DESCRIPTION OF THE EMBODIMENTS

Embodiments of the present invention will be described in detail below with reference to the accompanying drawings.

For easy understanding of the embodiments, the configuration and environment of a system assumed by the embodiments will be described first, and then each embodiment will be explained.

Figure 1:
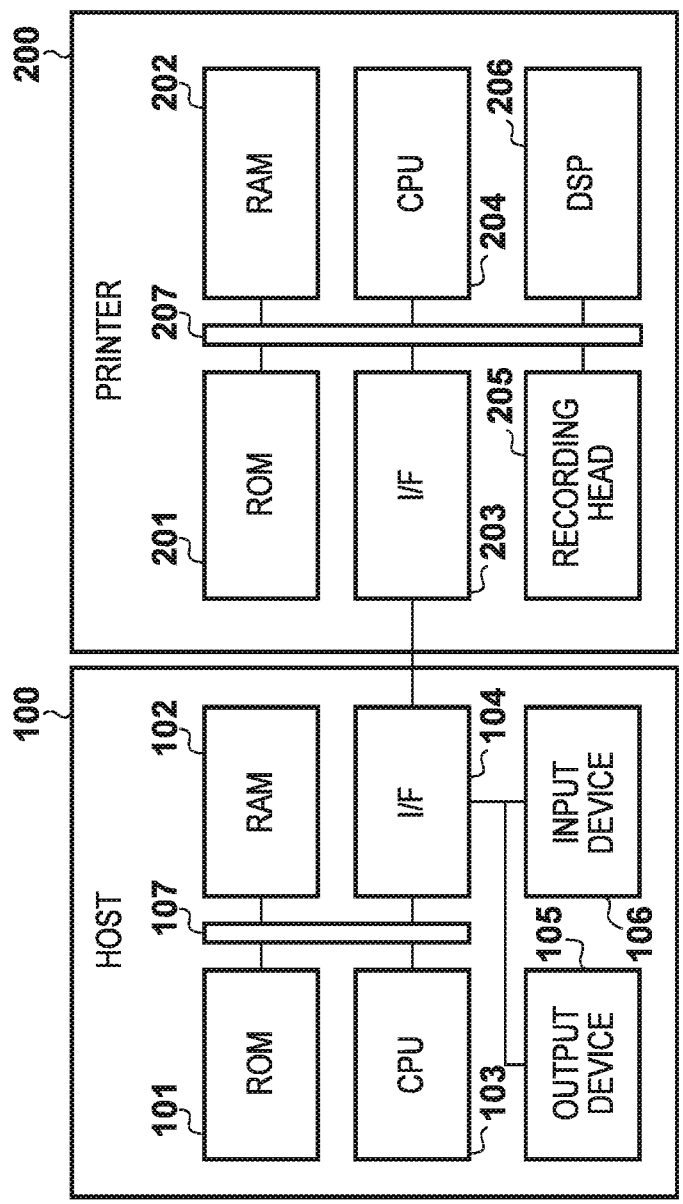
FIG. 1 is a block diagram showing the arrangements of a host and printer according to an embodiment.
Figure 9:
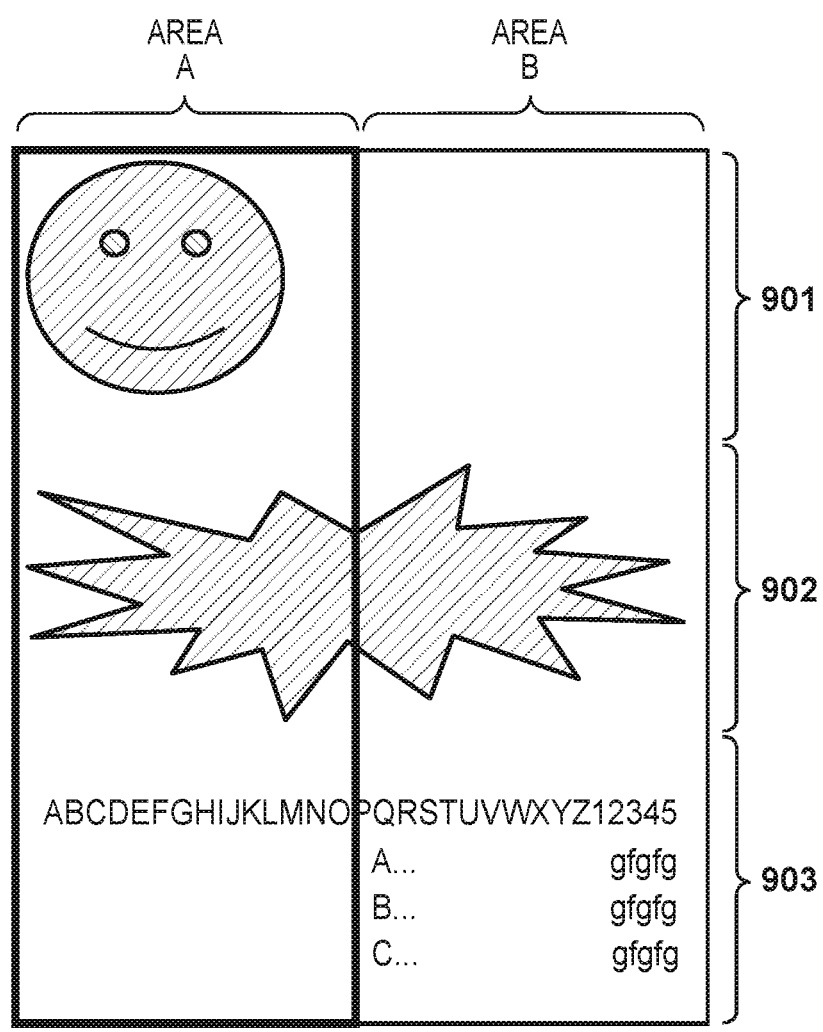
FIG. 9 is a view showing parallelization division in an image when conventional parallel processing is performed.

FIG. 1 is a block diagram showing the arrangement of a host 100 serving as a print data source and that of a printer 200 serving as an image recording apparatus.

The printer 200 includes a ROM 201 holding a program and table for performing print processing, a CPU 204 functioning as a control unit for the overall apparatus by executing the program, a RAM 202 used as a work area at the time of execution of the program, and an I/F 203 for wired or wireless connection to an external apparatus. The printer 200 also includes a recording head 205 in which a plurality of nozzles (recording devices) for discharging ink onto a recording medium (recording paper sheet) to output a print processing result are arrayed, and devices (not shown) such as motors for driving the recording head 205 and feeding a paper sheet. These devices are electrically interconnected via a bus 207. In some cases, the printer 200 includes a DSP 206 as a hardware device especially for performing heavy-load processing such as image processing. All or some of the devices are mounted as LSIs, and may be formed into parts as ASICs.

The printer 200 is communicably connected to the host 100 via the I/F 203. Note that parallelization according to an embodiment (to be described later) assumes an arrangement of connecting a plurality of devices (ASICs in the embodiment) each including processing units such as a CPU and DSP shown in FIG. 1.

In this case, parallel devices (ASICs) can communicate with each other via a bus or I/F. One of the parallel devices serves as a master device to arbitrate the overall processing or communicate with the host 100. The remaining devices serve as slave devices to individually perform processing in accordance with an instruction of the master device, and notify the master device of end of the processing to integrate processing results.

As the host 100, a general PC, mobile phone, smartphone, tablet, digital camera, or another mobile/standalone terminal is assumed. Devices included in the host 100 change depending on the main purpose of the apparatus but the host 100 generally has the following arrangement.

The host 100 includes a ROM 101 holding a program and table for performing processing of the host 100, a CPU 103 for executing the program, a RAM 102 used as a work area at the time of execution of the program, and an I/F 104 for wired or wireless connection to an external apparatus. These constituent units are electrically interconnected via a bus 107. An input device 106 used by the user to input an instruction to the host 100 and an output device (display device) 105 used by the host 100 to present information to the user are connected via the I/F.

Communication between the host 100 and the printer 200 will be described by exemplifying printing of a document when a smartphone terminal as a recent representative terminal is used as the host 100.

Assume that the user operates the smartphone (host 100) to browse documents saved in the smartphone. If the user finds a document to be printed while browsing the documents, he/she calls, via the input device 106 such as a touch panel, print processing provided by an OS (Operating System) on the smartphone.

In a currently, generally popular smartphone terminal, an integrated printing protocol is provided on the OS by cooperation between a terminal vendor and a printer vendor. Upon receiving a print instruction from the user, the OS on the smartphone converts the currently viewed document into some image format, and then creates a print job according to the above-described printing protocol. For example, the OS forms a bitmap image via an application which currently views document data to be printed, and compresses the bitmap image into a JPEG image. The OS creates, in an XML document format, a print job file including the compressed image, and transmits, via a wireless LAN I/F (interface 104), the created print job file to the printer 200 registered in advance.

A processing sequence by the printer 200 when the printer 200 is non-parallel (single processing) will be described with reference to FIG. 2.

In step S210, the CPU 204 of the printer 200 receives, via the I/F 203, a print job transmitted from the host 100. Assume that the print job contains a JPEG image. The CPU 204 decompresses the contents of the received job to acquire print data (print image). In this embodiment, the CPU 204 decompresses the print job file by a functioning XML parser, and acquires the JPEG image and information such as a paper sheet setting and print quality setting. The CPU 204 stores the acquired information in the RAM 202.

In step S220, the CPU 204 decodes the print image. In this example, the CPU 204 decodes the JPEG image. Note that the dedicated DSP 206 may decode the image instead of the CPU 204. The entire page may be collectively decoded and rasterized on the RAM. However, to save the capacity of the incorporated RAM, data of each short band may be decoded to update rasterized data in the RAM, as needed, in response to a request from image processing of the succeeding stage. A decoding result is rasterized on (stored in) the RAM 202 by forming an 8-bit multi-valued color image for each of color components of R, G, and B.

In step S230, the CPU 204 performs image processing for the multi-valued color images. The image processing will be described later with reference to FIG. 5. The result of the image processing is rasterized on the RAM 202 as 4-bit (16-tone) multi-valued ink color image data for each of recording color components of C, M, Y, and K.

In step S240, the CPU 204 performs processing of generating recording image data to be used as a driving signal of each nozzle of the recording head 205 based on the multi-valued ink color image data. The generation processing will be described later with reference to FIG. 6. The recording image data has 1 bit (binary data) representing whether or not to discharge ink for each color component, and is also rasterized on the RAM 202. The CPU 204 stores a data order in the RAM 202 by sorting the data so as to form an image on a paper surface in a correct direction at the time of transmission to the head device.

In step S250, the CPU 204 transmits the recording image data arranged to be transmittable to the recording head 205, and drives the recording head 205 and feeder, thereby performing print processing. The print processing will be described later with reference to FIG. 7.

The image processing in step S230 will be described with reference to FIG. 5.

The CPU 204 performs color space conversion into the YMCK recording color space of the image processing device of the printer for the RGB multi-valued color images obtained by decoding the JPEG image (step S510). As the recording color space, color space definition representing a color gamut (gamut) which can be printed and expressed by a normal printer is used. In this color conversion process, an input color outside the color gamut of the printer is compressed into an appropriate output color (gamut compression).

In step S520, the CPU 204 performs color separation into multi-valued information using ink colors incorporated in the printer for the YMCK multi-valued color images after the color conversion. If the printer uses four colors of C, M, Y, and K, black indicated by RGB (0, 0, 0) is converted into CMYK (0, 0, 0, 255), and red of RGB (255, 0, 0) is converted into CMYK (0, 255, 255, 0), as needed. This conversion may be performed by calculation or by using a table.

In step S530, the CPU 204 performs tone correction for the signal value of each ink color after color separation. The purpose of tone correction is as follows. In general, as the inkjet printer discharges a larger amount of ink per unit area, the color of the ink appears on the paper surface more intensely. However, an ink discharge count and color development (a spectral reflection factor, Lab values, and the like) on the paper surface have nonlinear response characteristics. Tone correction is processing for correcting the characteristics.

In step S540, the CPU 204 quantizes the signal value of each ink color after tone correction. Quantization determines the dot discharge level of ink per unit area on the paper surface. Note that if the dot discharge count is one, a quantization result corresponds to the presence/absence of dot discharge intact (binarization). If the dot discharge count is two or more, only the discharge level is determined here, and the presence/absence of actual discharge and the discharge count are confirmed by index expansion (to be described later).

Any method may be adopted as a quantization method. However, adopting a quantization method such as a dither method which requires no information transmission between pixels increases the degree of freedom of setting of area division for parallelization, and is thus more effective.

The recording image data generation processing in step S240 described above will be explained with reference to FIG. 6.

In step S610, the CPU 204 determines the presence/absence of actual discharge and the discharge count are determined based on the discharge level value after quantization. At the time of index expansion, a known technique is used. For example, dot arrangements respectively corresponding to quantization levels are stored as a table in advance, and a dot arrangement (a binary value of the discharge/non-discharge of ink) is determined based on the quantization level.

This index expansion determines a final dot arrangement destination on the paper surface. If, for example, the head can arrange dots at a resolution of 1,200 dpi×1,200 dpi on the paper surface, a value indicating whether or not to arrange a dot is set for each coordinate point obtained by dividing the paper surface into a grid of 1,200 dpi×1,200 dpi.

In the serial head inkjet printer, color unevenness or a stripe caused by a positional shift degrades the image quality depending on the landing accuracy of ink droplets at the time of printing. To avoid this, it is effective to execute printing (multi-pass recording or multi-pass printing) by a plurality of scans instead of executing printing (1-pass printing) by one scan on the paper surface. This processing will be referred to as pass separation processing hereinafter. In step S620, the CPU 204 performs this pass separation processing. Note that a pass separation method can take measures against various kinds of positional shifts, and a method already invented and proposed as a known technique is used, as needed.

The above image processing is generally performed by scanning an image in the raster direction with respect to the paper surface, and arranging a processing result in the same direction on the RAM. To the contrary, when actually transmitting information to the head, it is necessary to perform processing of rearranging the image in a direction (for example, a column direction) in which the head accepts the information. This processing will be referred to as H-V conversion hereinafter. In step S630, the CPU 204 accesses the RAM 202 to perform H-V conversion. Alternatively, the CPU 204 may directly input the image arranged in the raster direction by burst transmission via dedicated hardware to increase the speed of processing, rearrange the image in the SRAM on the hardware, and directly transmit a rearrangement result to the head device.

The print processing in step S250 will be described with reference to FIG. 7. FIG. 7 is a view showing the arrangement of the recording unit of the inkjet printer incorporating a general serial head. The recording unit includes a paper feed shaft 701 and a paper discharge shaft 702 as paper feed devices. When the shafts 701 and 702 rotate with respect to a printing paper sheet 707 nipped via a nip device (not shown), the printing paper sheet can be fed at an arbitrary linear speed.

Ink tanks 704 are installed in a carriage 705, and each color ink passes through a channel (not shown) of the carriage 705, and is supplied to the recording head 205 of recording colors of Y, M, C, and K. The recording head 205 is connected to the bus 207 of the printer via a communication cable (not shown), and executes discharge control at an arbitrary timing by receiving head discharge control information and image information after the above-described H-V conversion. When a heater (not shown) on the head is heated, the ink is rapidly heated, a bubble is formed by film boiling, and an ink droplet is discharged toward the recording medium by the pressure of bubble generation. Note that a diaphragm may be displaced by driving a piezoelectric element (not shown) on the head, and an ink droplet may be discharged toward the recording medium by a change in pressure caused by the displacement.

On the recording head 205, arrays each including 512 discharge nozzles are arranged at an interval of 600 dpi for the respective colors. The presence/absence of discharge can individually be controlled for each nozzle. One scanning motion of the carriage 705 can thus discharge ink with respect to a height of, for example, 0.85 inches. The carriage 705 is connected to a guide rail 703, and can be moved to an arbitrary horizontal position on the paper surface of the printing paper sheet by the operation of the guide rail. Note that a dotted arrow described as "x: carriage scanning direction" in FIG. 7 indicates the scanning motion direction of the carriage 705, which is generally called a main-scanning direction. A dotted arrow described as "y: conveyance direction" is in a direction (intersecting direction) orthogonal to the x-axis, and indicates the conveyance direction of the paper sheet 707, which is generally called a sub-scanning direction. Note that each of motors (not shown) for respectively driving the guide rail and shafts is connected to the I/F of the printer via a communication cable, and can increase/decrease the speed at an arbitrary acceleration by receiving a control signal from the CPU 204 or DSP 206.

The serial inkjet printer can move the head to an arbitrary position on the paper surface and discharge ink by combining the movement of the carriage 705 and the movement (conveyance) of the printing paper sheet (recording medium).

For example, when printing the entire surface of an A4 paper sheet (about 8.5-inch width ×11-inch height), printing is executed for an area of 8.5-inch width×0.85-inch height by discharging ink while moving the carriage between the left and right ends. After that, the paper sheet is fed forward by 0.85 inches to move the carriage and discharge ink again. By repeating these operations, printing is completed by 13 printing scans in total for 1-pass printing. When executing multi-pass printing described above, if 4-pass printing is executed by dividing the paper surface into four areas, the moving amount of the paper sheet fed by one operation motion of the carriage 705 is set to 0.21 inches, and 52 printing scans in total are performed.

It is possible to execute printing by setting a shorter moving distance depending on the layout of an image to be printed. For example, for the image of the layout shown in FIG. 8A, controlling the feed amount and the scan width of a margin area makes it possible to complete printing by 12 printing scans by omitting movement in an unnecessary portion, for example, by printing scans in areas indicated by strips in FIG. 8B.

Note that dotted arrows of "x: carriage scanning direction" and "y: conveyance direction" in FIG. 8A indicate the same directions as those shown in FIG. 7.

As described above, it is possible to suppress the total print time shorter by appropriately setting a printing scan sequence by controlling the movement of the carriage 705 and the conveyance of the paper sheet 707. Such control is effective especially for a print image including a large margin, such as an office document, and particularly offers convenience to the user who prints such document. The print processing in the conventional general printer has been explained.

Note that it is necessary to reliably arrange dots on the paper surface while the carriage 705 moves. In other words, it is necessary to supply data to be able to discharge ink in real time. To do this, in general, a data buffer of one scanning motion of a printing scan is prepared, and print data is transmitted to the head using a sufficiently high speed method such as burst transmission after completion of the data buffer. The CPU 204 of the printer executes various processes other than print control and image processing, and these processes are executed by multitasking in the OS environment such as a real-time OS. Among others, print control is a task which is most required to have the real-time characteristic, and is instructed to complete within a scheduled time by setting a high task priority on the OS.

Note that feeding of the paper sheet between scans can stand by, as needed, to operate after completion of the data buffer.

However, if the feed time of the paper sheet between scans varies, the print processing itself is performed but the print image quality is adversely affected. Ink of the inkjet printer is generally made of a dye and a solvent. The solvent penetrates into the paper surface or evaporates after landing on the paper surface, and the dye is fixed on the paper surface, thereby executing printing. At this time, the fixing position of the dye is influenced by the content of the dye or solvent around it, and the result influences color development after fixing.

Such influence cannot be neglected between inks at the boundary with an adjacent area in each scan. Therefore, in image design of the inkjet printer, the dot arrangement and the discharge count in the adjacent area are controlled in consideration of the influence of the adjacent area in each scan. For example, if color development is darker in the adjacent area than in the center area in each scan due to the influence, control is executed so that the center area and adjacent area have the same color development after fixing by discharging ink to the center area in each scan by a smaller discharge count.

To the contrary, if the feed time between scans varies, the influence of the adjacent area in each scan varies, and control cannot be executed equally, thereby degrading the image quality in a partial area due to color development unevenness or a stripe.

To prevent this, data buffers of two scans are prepared (double buffer), and processing of, for example, supplying data for the next printing scan is performed at the time of execution of the current printing scan. By assuming that data supply is interrupted due to an unexpected event, an area for three or more scans may be prepared. However, as the number of prepared buffers increases, the cost of the printing apparatus is influenced more.

To stably supply data for a printing scan, it is necessary to execute each process such as decoding, image processing, or print data setting at a speed higher than the print speed. As described above, to increase the print speed, for example, the printing scan sequence shown in FIG. 8B may be set.

In this case, it is necessary to execute each image process at a speed higher than the print speed. For example, since only the left half area of the paper surface is printed in the first scan of FIG. 8B, printing is completed at twice the normal print speed of the full width of the paper surface. Therefore, it is necessary to execute each process such as decoding, image processing, or print data setting for the corresponding area at twice the normal speed. Since the number of pixels to be processed is halved, it is possible to perform processing for each pixel within a short time accordingly. However, since the necessary time of processing such as various setting processes and interrupt control for the DPS is fixed, it may be necessary to consider the time.

If the printing scan sequence is set, as shown in FIG. 8B, the necessary time of each scan may be different between scans. This is a difference on the smaller order, as compared with generation of a variation in feed time. In general, the image quality hardly deteriorates due to a difference in necessary time between scans. Since the necessary time of each scan is determined by the left and right end positions of each scan, it is possible to prevent the image quality from deteriorating by correcting a dot arrangement in advance in consideration of the necessary time.

The technique assumed by the embodiments has been explained. The embodiments of the present invention will be described next. In the embodiments, a plurality of ASICs parallelly execute image processes for different areas.

[First Embodiment]

As described above, a recording head 205 includes 512 nozzles arranged in line along the y-axis of FIG. 7 for each color. In the first embodiment, the 512 nozzles are divided at the center, and two ASICs perform parallel processing to generate recording image data each for ½ the width recorded by one scanning motion of a carriage. Another ASIC for comprehensively controlling the two ASICs is included. The latter ASIC will be referred to as a master ASIC hereinafter, and the former two ASICs will be referred to as slave ASICs hereinafter.

Although the processing when recording is performed by a single unit is shown in FIG. 2, processing according to the first embodiment is shown in a flowchart of FIG. 3. Referring to FIG. 3, processes in steps S360a and S360b are performed by the two slave ASICs, respectively, and other processes in steps S310 to S350 and S370 to S399 are performed by the master ASIC.

Note that a description of processing steps in which the same processes as those in the single processing are performed will be omitted. As the practical arrangement of a printer according to the first embodiment, an arrangement shown in FIG. 10 is considered. In this arrangement, a ROM, RAM, I/F, CPU, and DSP are connected via a bus and packaged as one ASIC. Three ASICs are star-connected via the I/Fs. Reference numeral 1000 denotes a master ASIC; and 1010 and 1020, slave ASICs. The master ASIC 1000 takes charge of all processes other than image processes, and takes charge of communication via an external I/F of a printer 200, communication with the head, and control of each of the slave ASICs 1010 and 1020. The slave ASICs 1010 and 1020 take charge of only the image processes, and parallelly execute image processes for image areas assigned by the master ASIC 1000.

Note that the parallelization unit and connection form are not limited to them. For example, the connection form between the ASICs is not limited to the star connection, and may be a daisy chain connection or the like. Any physical connection arrangement may be adopted as long as a path through which each of the slave ASICs 1010 and 1020 can communicate with the master ASIC 1000 is prepared. Furthermore, a single ASIC may incorporate a plurality of CPUs which may serve as a master CPU and slave CPU. Especially, if a DSP is used to mainly take charge of the image processing, a plurality of DSPs may be incorporated, and used as "slave DSPs" from the master CPU.

Alternatively, different ASICs may be adopted in accordance with the characteristics of the processes executed by the master ASIC 1000 and the slave ASICs 1010 and 1020. For example, since the master ASIC 1000 mainly takes charge of communication with an external apparatus, rendering/decoding of an image file to be printed, and the like, the CPU, GPGPU (general-purpose GPU), and the like may be enhanced to expand programmable computation resources in order to flexibly accept various inputs. Each of the slave ASICs 1010 and 1020 may have as its main purpose to perform predetermined image processing at a high speed, and may be configured to mount a dedicated image processing H/W.

The master ASIC 1000 itself may parallelly execute image processing with the slave ASICs 1010 and 1020. In this case, the master ASIC 1000 functions as one slave ASIC.

In step S310, the master ASIC 1000 acquires print data from a host 100, similarly to step S210 of FIG. 2. In step S320, the master ASIC 1000 performs decoding processing of encoded image data (JPEG image data) contained in the print data, similarly to step S220 of FIG. 2. In step S330, the master ASIC 1000 evaluates printing areas (or recording areas). The printing area evaluation processing will be described below.

The master ASIC 1000 analyzes a multi-valued color image obtained by decoding, and evaluates a position on the paper surface at which printing is executed. More specifically, the master ASIC 1000 evaluates each pixel value of 8-bit RGB data, and interprets a pixel of (255, 255, 255) as a "white pixel". Areas other than those pixels are interpreted as "nonwhite pixels". The white pixel indicates that no ink is discharged at the pixel position. The nonwhite pixel indicates that some ink is discharged at the pixel position to generate a significant dot on the paper sheet. Therefore, the master ASIC 1000 evaluates a carriage moving range in each scan in consideration of the scan width of the recording head 205. The left/right end positions of "nonwhite pixels" existing in each raster within the scan width (512 lines) of the recording head 205 are extracted. The x-coordinate of the leftmost position among the left ends of all the rasters of one scan width (512 lines) is determined as a scan left end, and the x-coordinate of the rightmost position among the right ends of all the rasters is determined as a scan right end. An area between two ends defined by the determined scan left and right ends is determined as a printing range to be recorded by one scan of the recording head 205.

Note that a blank area may be included between the scan left and right ends. For example, in FIG. 8A, a character string "A . . . gfgfg" is described in a lower portion 803 on the paper surface. Although a blank area exists in the middle of the character string, the head performs a scan operation in the area, and thus the blank area is included in the printing area.

When the positions of the left and right ends of one scan are determined, the start raster of the next scan is determined. For the next raster of the current scan and subsequent rasters, a raster in which at least one "nonwhite pixel" exists in one line is set as a start raster, and evaluation is performed in the same manner for a stripe area having a width corresponding to the scan height of the head from the start raster. Information for defining the moving range of each scanning motion of the recording head and the conveyance amount of the recording medium is stored as sequence information in, for example, the RAM of the master ASIC 1000.

In this way, evaluation is performed to determine a printing area for each scan. For example, for the image shown in FIG. 8A, printing areas are determined, as shown in FIG. 8B.

Note that the left and right ends may be determined by a different method in accordance with the constraints and characteristics of head driving. For example, at the time of actual carriage movement, it is considered that the right end portion in the forward direction and the subsequent right end portion in the backward direction are at the same position. Similarly, it is considered that the left end portion in the backward direction and the subsequent left end portion in the forward direction are at the same position. When the carriage reverses the moving direction, the speed is increased/decreased. Therefore, to minimize direction reversal, such movement sequence is preferable. In this case, for example, for the image shown in FIG. 8A, printing areas are determined, as shown in FIG. 8B.

In addition, many techniques are already known for the efficient operation of the serial head. Even if a head sequence is determined using these techniques, it is possible to obtain the effects of the present invention by determining divided areas in accordance with the head sequence.

The processing in step S330 may be performed by a method other than that of performing the processing for a bitmap image after decoding. For example, the x-coordinates of the left and right ends of the nonwhite area of each line in image data may be added to print job information transmitted from the host 100 to the printer 200 in addition to the image data, and may then be referred to. The x-coordinate of each pixel can be sufficiently expressed by a 16-bit value. The x-coordinates of the left and right ends of each line can be expressed by an information amount of four bytes in total. Furthermore, since correlation between the x-coordinates of the left and right ends of each line can be expected to some extent, lossless compression can be effectively used. Consequently, the processing in this step can be significantly saved in labor by a small amount of additional information.

Alternatively, at the time of decoding processing, processing corresponding to this step may be simultaneously executed. If white pixel evaluation of pixel values and left/right end determination are performed in a process of outputting a bitmap image by the decoding processing, memory access for the bitmap image as a decoding result can be omitted.

Alternatively, processing of performing only white pixel evaluation of pixel values and left/right end determination without outputting a bitmap image as a decoding result may be prepared as pre-decoding processing, and used.

As described above, if this step is performed in cooperation with job acquisition and decoding processing, it is essential to use a specific job format/encoding format corresponding to the cooperating processes. Instead, memory access processing to all the pixels of the bitmap image is unnecessary, and the processing load can be significantly reduced.

Next, in step S340, the master ASIC 1000 determines parallel divided areas. That is, for the printing areas in the respective scans determined in step S330, the master ASIC 1000 determines portions in these areas to be assigned to the slave ASICs 1010 and 1020.

In the first embodiment, as a division method for improving the processing parallelism of each ASIC in the printing areas, a method of equally dividing, into upper and lower areas, the printing area of one scanning motion of the head for the slave ASICs 1010 and 1020 is adopted. The area of one scanning motion of the serial head undergoes print processing with a constant image width regardless of the shape of the image. In other words, print processing is performed at a constant speed within the area. That is, if the area is equally divided into upper and lower areas in this unit, the image processing load can be equally distributed regardless of the shape of the image.

A result of determining parallel divided areas for the printing areas shown in FIG. 8B by this method is as shown in FIG. 11. Referring to FIG. 11, the slave ASIC 1010 takes charge of areas A indicated by rectangles with thick frames and the slave ASIC 1020 takes charge of areas B indicated by rectangles with thin frames.

The processing in this step may be performed in advance on the host. Especially, if the host knows in advance the parallel arrangement and printing device arrangement of a printer as a transmission destination, the processing load on the printer side can be largely reduced by performing the processing in advance. In this case, in addition to the image data, information indicating a specific area of each image data to be processed by a specific slave ASIC is added to the print job information transmitted from the host to the printer. Consequently, the printer side can sequentially assign a transmitted image to the respective slave ASICs without analyzing it.

In step S350, the master ASIC 1000 transmits (or distributes) data of the determined areas of the image data obtained by decoding to the slave ASICs 1010 and 1020, and causes them to perform necessary processes. More specifically, the following procedure is performed.

The master ASIC 1000 notifies the slave ASIC 1010 of the start of image transmission. The slave ASIC 1010 prepares for reception of image transmission, and then transmits a response indicating that image transmission is possible. An image area which is necessary to be transmitted to the slave ASIC 1010 is extracted from the RAM area of the master ASIC 1000, and transmitted to the slave ASIC 1010 via the I/F in combination of tag information indicating the area. The tag information includes the area division ID of each area, and the width, height, and absolute coordinates on the paper surface of the area. These pieces of information are needed to make various image processing settings when the slave ASIC 1010 performs image processing of each area. The slave ASIC 1010 receives the pieces of information, and stores them in its RAM area. After completion of transmission, the master ASIC 1000 notifies the slave ASIC 1010 of an image processing start request. Upon receiving the request, the slave ASIC 1010 starts image processing. Similar procedure is also performed between the master ASIC 1000 and the slave ASIC 1020.

In step S360a, the slave ASIC 1010 performs image processing for the image areas assigned to itself. In step S360b, the slave ASIC 1020 performs image processing for the image areas assigned to itself. Each of the slave ASICs 1010 and 1020 performs image processing of each area using the tag information transmitted from the master ASIC 1000. For example, if a dither method is used as a quantization method, the reference position of a dither pattern is determined based on the "absolute coordinates on the paper surface" included in the tag information. Therefore, no discontinuity of the image quality occurs at the boundary between the areas processed by the slave ASICs 1010 and 1020.

In step S370, each of the slave ASICs 1010 and 1020 transmits the processed data to the master ASIC 1000. More specifically, the following procedure is performed.

Each of the slave ASICs 1010 and 1020 notifies the master ASIC of completion of the processing of itself. A case in which the slave ASIC 1010 notifies the master ASIC 1000 of completion of the processing will be exemplified here.

Upon receiving the notification, the master ASIC 1000 notifies the slave ASIC 1010 of an image transmission request. The slave ASIC 1010 transmits image information of the result of quantization processing in each image area assigned to itself in combination with the tag information corresponding to each area to the master ASIC 1000 via the I/F. The tag information includes at least the area division ID of each area. Since the master ASIC 1000 executes area division, if at least the area division ID of each area can be specified, the master ASIC 1000 can derive other pieces of information (the width, height, and absolute coordinates on the paper surface of the area, and the like) accompanying the area. The master ASIC 1000 receives these pieces of information in the RAM area of itself. After completion of transmission, the slave ASIC 1010 notifies the master ASIC 1000 of completion of transmission. By repeating the above processing, transmission from the slave ASIC 1010 to the master ASIC 1000 is performed. Transmission from the slave ASIC 1020 to the master ASIC 1000 is performed by substantially the same procedure.

In step S380, the master ASIC 1000 combines the transmitted images. That is, the master ASIC 1000 combines the respective images received in step S370, rearranges the images of one scan of the recording head in the RAM area in a format corresponding to the absolute coordinate position of the original image. Alternatively, by making the RAM area, in which the images are stored after reception, correspond to a rearrangement destination at the time of reception in step S370, this step may be omitted. In this case, the number of RAM accesses can be reduced accordingly.

In step S390, the master ASIC 1000 generates recording image data of each ink color, similarly to step S240 described above. In step S399, similarly to step S250 described above, the master ASIC 1000 performs processing of controlling driving of the recording head, thereby executing print processing.

The processes in steps S330 to S399 are repeatedly performed for each scan of the recording head.

As described above, according to the first embodiment, even if any print data is processed, loads on the two ASICs (the slave ASICs 1010 and 1020 in the embodiment) can be substantially equal to each other. Therefore, parallel processing can be implemented with high efficiency, and a low-end, high-speed serial head inkjet printer can be provided without degrading the image quality.

Note that only the image processes are parallelized in the above description. Processes including other processes may be parallelized. For example, image processing and print data generation may be parallelized. In this case, each slave generates print data after the image processing, and then transmits the print data to the master.

The slave ASICs 1010 and 1020 may perform the same processing redundantly. For example, the slaves may process three steps of decoding, printing area evaluation, and parallel divided area determination redundantly. For example, FIG. 4 shows a processing sequence in this case. Each step will be explained below.

In step S410, the master ASIC 1000 acquires print data from the host 100, similarly to step S310 described above. In step S420, the master ASIC 1000 transmits the acquired print data to the slave ASICs 1010 and 1020. In this case, since the master ASIC 1000 transmits the same data to all the slave ASICs (in this embodiment, two slave ASICs), it may broadcast, for example, multicast the data.

Steps S430a, S440a, S450a, and S460a indicate processes executed by the slave ASIC 1010, and steps S430b, S440b, S450b, and S460b indicate processes executed by the slave ASIC 1020. For the sake of simplicity, the processing of the slave ASIC 1010 will be described below. In step S430a, the slave ASIC 1010 performs decoding processing for the received print data. In step S440a, the slave ASIC 1010 performs printing area evaluation processing, similarly to step S330 described above. In step S440a, the slave ASIC 1010 performs processing of determining parallel divided areas, similarly to step S340. In step S460a, the slave ASIC 1010 performs image processing for areas assigned to itself, similarly to step S360 described above. Although the processing of the slave ASIC 1010 in step S460a is the same as that of the slave ASIC 1020 in step S460b, image data to be processed are different.

In step S470, the master ASIC 1000 receives the processed data from the slave ASICs 1010 and 1020, similarly to step S370 described above. After that, the master ASIC 1000 performs processing of combining the processed image data received from the slave ASICs 1010 and 1020, similarly to step S380 described above. In step S490, the master ASIC 1000 generates recording image data of each ink color, similarly to step S390. In step S499, the master ASIC 1000 performs processing of controlling driving of the recording head, thereby executing print processing.

As described above, when the slave ASICs 1010 and 1020 perform the same processing redundantly, the processing amount of each slave increases accordingly. Since, however, compressed data before decoding is transmitted, the transmission amount can be saved. This is especially effective in, for example, a product arrangement which cannot sufficiently ensure a transmission band between ASICs.

In this embodiment, two-parallel processing has been exemplified by preparing the two slave ASICs 1010 and 1020. However, it is possible to obtain the same effects even if the number of slave ASICs is three or more.

Furthermore, in this embodiment, in step S340, the load is equally distributed by equally dividing the image area. However, if processing loads on the respective pixels are not equal to each other, the load may be distributed in consideration of it. For example, image processing is assumed in which color processing contents are different between a case in which the type of a pixel object of an image indicates a "character" and a case in which the type of a pixel object indicates a "natural image", and the processing load becomes twice to perform high accuracy processing in the color processing for the "natural image". In this case, if the image area is simply divided into two areas, when one area A is formed by "characters" and the other area B is formed by "natural images", the processing load of area B is twice the processing load of area A. In the system of such image processing, area division is performed so that the total processing load is equally distributed to the divided areas in consideration of the weights of processing loads on the respective pixels. If the throughputs of the slave ASICs 1010 and 1020 are different, the image area may be divided in proportional to the throughputs instead of equally dividing the image area.

[Second Embodiment]

In the first embodiment, an area recorded by one scanning motion of the recording head 205 is divided into N areas in the conveyance direction of the paper sheet, and N ASICs perform image processes of the divided areas. In the second embodiment, an example in which an area recorded by one scanning motion of a recording head is divided into N areas along the scanning motion of the recording head, and processed by N ASICs will be described. For the sake of simplicity, an example of N=2 will be explained.

Characteristic part of processing in the second embodiment corresponds to step S340 of the flowchart of FIG. 3. The remaining part is the same as in the first embodiment.

An area of one scanning motion of a serial head undergoes print processing with a constant image width regardless of the shape of an image. In other words, print processing is performed at a constant speed within this area. That is, if the area is equally divided into left and right areas in this unit, the image processing load can be equally distributed regardless of the shape of the image.

FIG. 12 shows the determination result of parallel divided area determination processing in step S340 for printing areas shown in FIG. 8B according to the second embodiment.

Referring to FIG. 12, a slave ASIC 1010 takes charge of areas A indicated by rectangles with thick frames and a slave ASIC 1020 takes charge of areas B indicated by rectangles with thin frames. In the first embodiment, parallelization is performed by equally dividing an area into upper and lower areas for each head scan of the recording head. In this case, the parallelization count is limited to, at most, the number of pixels corresponding to the height of the head scan. For example, the parallelization count is limited to, at most, 512 for a head having an arrangement of 600 dpi×512 nozzles. To the contrary, if the method according to the second embodiment is adopted, the parallelization count can take up to the full width of the head scan width. If an A4 image is printed with 600 dpi, the number of pixels of the full width is about 5,000, and parallelization count can be at most 5,000.

[Third Embodiment]

In the first and second embodiments, parallelization is performed by equally dividing one scan area of the recording head into upper and lower areas or left and right areas. The third embodiment will propose a different division method. The difference from the first and second embodiments is that the processing in step S380 of FIG. 3 becomes unnecessary and processing contents in step S340 are different. In step S340, for printing areas determined in step S330, a master ASIC 1000 determines specific portions in the areas to be assigned to slave ASICs 1010 and 1020.

In the third embodiment, as a division method for improving the processing parallelism of each ASIC in the printing areas, division is performed based on the following rules.

(i) An area of one scanning motion in a printing scan is assigned to a single slave ASIC. (In the second embodiment, an area of one scanning motion is equally divided into left and right areas.)

(ii) For the printing scan areas, an ASIC to take charge of an area is determined for each scanning motion from the top of a paper surface. At this time, the number of processing pixels of the ASIC is counted, and the single ASIC takes charge of a plurality of continuous scan areas until the total number reaches a predetermined amount. In the third embodiment, the number of pixels of an area of "the head height of one scanning motion×the full paper width" is set as the "predetermined amount".

(iii) When the predetermined amount is reached, another ASIC takes charge of areas. Areas assigned to the other ASIC are determined based on the total number of processing pixels.

Note that N(i) represents the number of pixels of the ith scan area, and Th represents a threshold indicating the "predetermined amount". The above rules are expressed more apparently as follows.

"As long as $\Sigma N(i) \leq Th$ (for i=1, 2, . . . ), it is determined that one slave ASIC takes charge of areas. When $\Sigma N(k) > Th$ for the number N(k) of pixels of the kth scan area, it is determined that another slave ASIC takes charge of the kth scan area and subsequent areas. This processing is repeated."

Another expression of the above description is as follows.

The divided area determination unit obtains the number of pixels to be recorded by one scanning motion of the recording head, and accumulates it for each scanning motion. In this process, if the threshold is reached by accumulating the number of pixels recorded by a scanning motion of interest, areas from the scanning motion in which accumulation has started to the scanning motion of interest are determined as divided areas to be assigned to one processing unit. To determine divided areas to be assigned to the next processing unit, the accumulation result is reset to restart accumulation from the next scanning motion of the scanning motion of interest.

Figure 13:
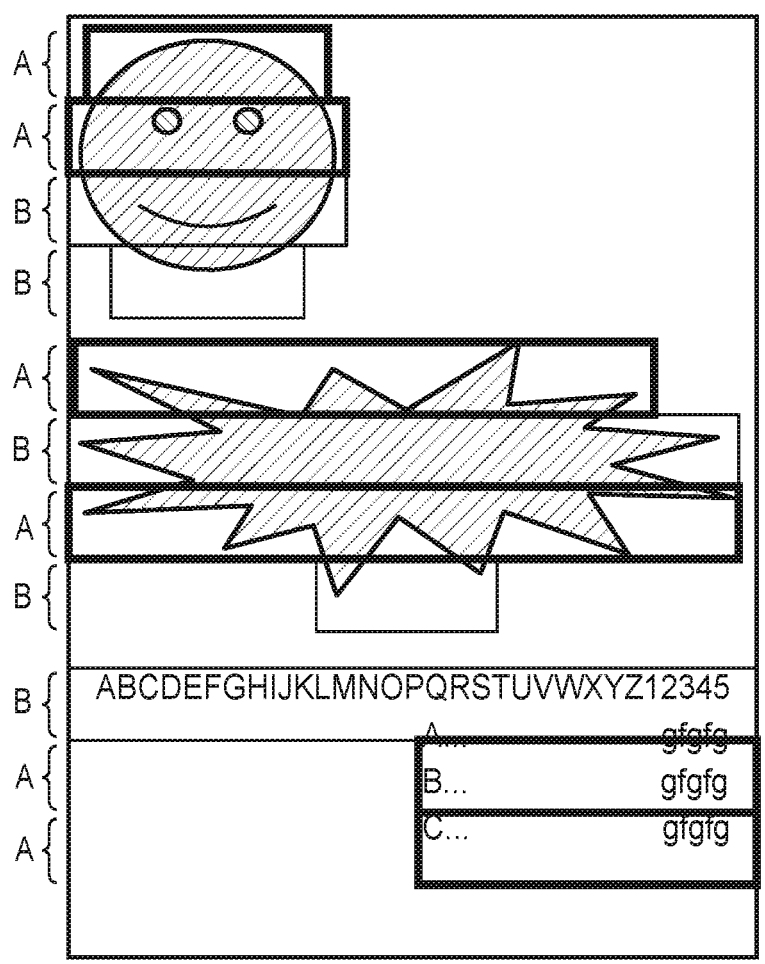
FIG. 13 is a view showing parallelization division of an image according to the third embodiment.

FIG. 13 shows the result of determining parallel divided areas for printing areas shown in FIG. 8B by the method according to the third embodiment. The slave ASIC 1010 takes charge of areas A indicated by rectangles with thick frames and the slave ASIC 1020 takes charge of areas B indicated by rectangles with thin frames.

In this way, it is possible to equally distribute the processing load while limiting to processing by a single ASIC during one scanning motion of the head. Since the division granularity of parallelization is coarser than in the first and second embodiments, it is necessary to accordingly ensure a large buffer size of a data buffer before generation of print data. Instead, it becomes unnecessary to combine data by standing by for completion of processes of the plurality of slave ASICs when performing one scanning motion of print processing. Since printing can be executed by directly transmitting print data to the head after completion of the processing of the slave ASIC taking charge of the area, the overall control can take a simple arrangement, as compared with the first embodiment. According to the flowchart of FIG. 3, step S380 becomes unnecessary. At this time, a communication path through which each slave can directly communicate with the recording head may be prepared. Step S370 also becomes unnecessary by assigning, to each slave, printing and generation of print data of one scan area assigned to the slave. Since data transmission after image processing becomes unnecessary, this is especially effective in, for example, a product arrangement which cannot sufficiently ensure a transmission band between ASICs.

[Fourth Embodiment]

In the first to third embodiments, so-called 1-pass printing in which each area on a paper surface is printed by one scan of the head has been explained.

On the other hand, as described above, the serial head inkjet printer may perform so-called multi-pass recording in which each area on a paper surface is printed by scanning a head a plurality of times. Especially, multi-pass recording is required to provide high image quality in photo printing or the like.

By comparing 1-pass printing and multi-pass recording, 1-pass printing can complete printing at a higher speed, and thus a calculation amount to be processed per unit time tends to become large. Therefore, in general, a hardware arrangement having a throughput satisfying 1-pass printing can be adopted to exert sufficient performance at the time of multi-pass recording.

On the other hand, even in multi-pass recording, since high image quality is required, the print resolution may be increased and advanced complex processing may be performed as image processing. For example, color conversion processing may be simply performed by a 3×3 matrix operation in 1-pass printing, and color conversion processing may be performed by a three-dimensional LUT in multi-pass recording. In this case, in multi-pass recording, a calculation amount to be processed per unit time may become larger.

In the fourth embodiment, an implementation method in multi-pass recording will be described. Note that for the sake of simplicity, 2-pass printing will be exemplified as multi-pass recording. In 2-pass printing, every time each pass is printed by a recording head, a recording paper sheet is conveyed by ½ the height of one scan of a recording head 205. In this embodiment, since the recording head includes 512 nozzles for each recording color component, the recording paper sheet is conveyed by a length corresponding to 256 nozzles in one scan of the recording head 205. In general, in N-pass printing, every time printing of one pass is executed, the paper sheet is conveyed by 1/N of a width which can be recorded by the recording head.

Note that in a case in which printing is executed without shifting each pass (by scanning a plurality of times without feeding the paper sheet), the time necessary for printing is doubled, and it is possible to obtain the effects of the above-described first to third embodiments.

An example in which 2-pass printing is applied to the first embodiment will be described. The fourth embodiment basically adopts the same apparatus arrangement/processing sequence as in the first embodiment. However, the processing contents of "printing area evaluation" in step S330 of the flowchart of FIG. 3 are different, and the remaining processes are substantially the same. Step S330 will be described below.

A master ASIC 1000 analyzes multi-valued color image obtained by decoding, and evaluates a position on the paper surface at which printing is executed. More specifically, the master ASIC 1000 evaluates each pixel value of 8-bit RGB data, and interprets a pixel of (255, 255, 255) as a "white pixel". Areas other than those pixels are interpreted as "nonwhite pixels". After selection, the master ASIC 1000 evaluates a carriage moving range in each scan in consideration of the scan width of the recording head. The left/right end positions of "nonwhite pixels" existing in each raster within the scan width of the recording head are extracted. The x-coordinate of the leftmost position among the left ends of all the rasters is determined as a scan left end, and the x-coordinate of the rightmost position among the right ends of all the rasters is determined as a scan right end.

Note that the left and right ends may be determined by a different method in accordance with the constraints and characteristics of recording head driving.

When the left and right ends of one scan are determined, the start raster of the next scan is determined. For the next raster and subsequent rasters with respect to a raster which has advanced by ½ the height of the current scan, a raster in which at least one "nonwhite pixel" exists in one line is set as a start raster, and evaluation is performed in the same manner for a stripe area having a width corresponding to the scan height of the head from the start raster.

In this way, evaluation is sequentially performed to determine a printing area. For example, for an image shown in FIG. 8A, printing areas are determined, as shown in FIG. 14A.

In this example, each area 1401 indicated by a rectangle with a thick frame represents an area to be printed at the time of a scan of the recording head in the forward direction. Each area 1402 indicated by a rectangle with a thin frame represents an area to be printed at the time of a scan of the head in the backward direction by feeding the paper sheet by ½ the height of one scan of the recording head after the scan in the forward direction. That is, for each of the areas 1401 and 1402 on the paper surface, printing is competed by "forward scan→backward scan" or "backward scan→forward scan". Since the areas to be scanned are slightly different between the forward scan and the backward scan, the scan widths of the scans are generally different in many cases.

Figure 14B:
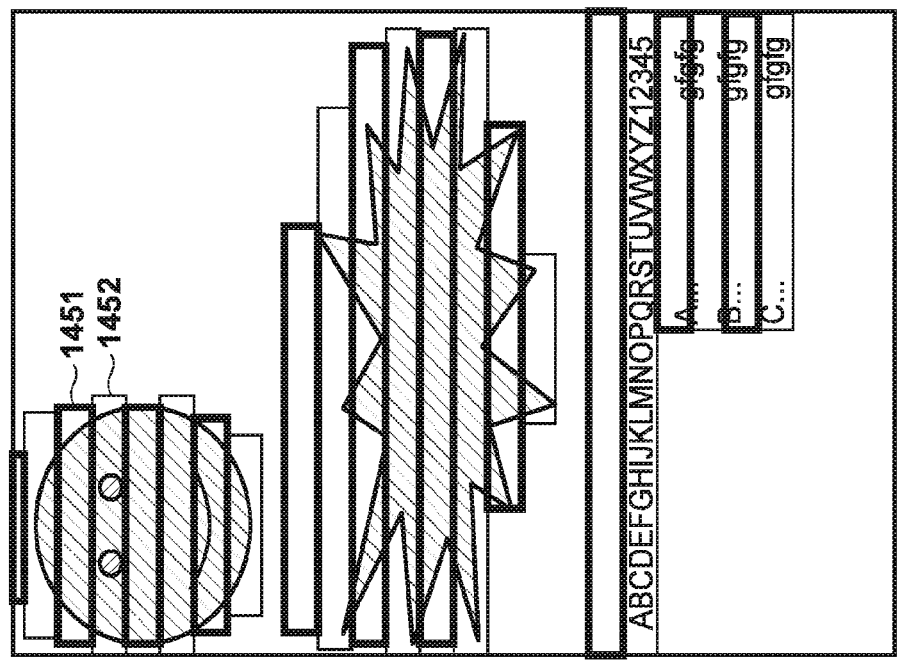
FIGS. 14A and 14B are views each showing parallelization division of an image according to the fourth embodiment.
Figure 14A:
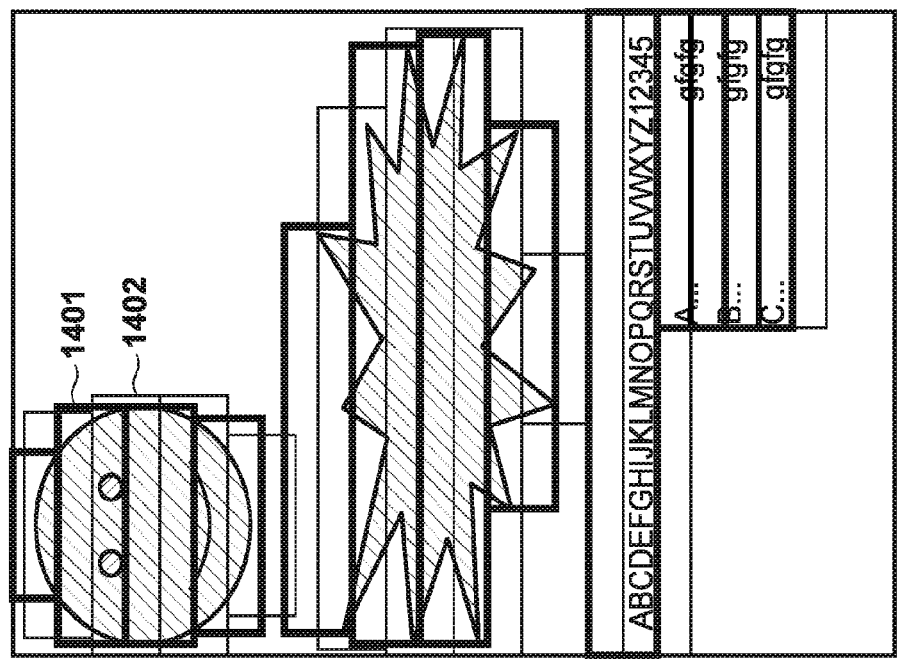

For the printing areas obtained as shown in FIG. 14A, the scan height per scan unit is changed to ½. This corrects the printing areas, as shown in FIG. 14B. Each area 1451 indicated by a rectangle with a thick frame corresponds to an area to undergo printing of the first pass by a scan of the head in the forward direction, and each area 1452 indicated by a rectangle with a thin frame corresponds to an area to undergo printing of the first pass by a scan of the head in the backward direction. That is, similarly to the first embodiment, it is possible to obtain parallel divided areas with high parallelism regardless of an image layout by equally dividing each rectangle expressed by a thick or thin frame in FIG. 14B.

In the above embodiments, the ASICs have been exemplified as processing units (devices) for performing parallel processing. Since, however, it is only necessary to perform processes independently of each other, the present invention is not limited to this. In the embodiments, the recording paper sheet is conveyed along the y-axis. However, the recording paper sheet need only be relatively conveyed, and the recording head (carriage) may be moved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD))m), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053958, filed Mar. 17, 2015 which is hereby incorporated by reference herein in its entirety.

What is claimed is:

1. An image recording apparatus for printing an image on a recording medium by performing a scanning motion of a recording head in which a plurality of recording devices are arrayed, and relatively conveying the recording medium in accordance with the scanning motion in a direction intersecting a direction of the scanning motion, the apparatus comprising:

a generation unit configured to generate, based on image data to be printed, sequence information indicating a moving range of each scanning motion of the recording head for each of a plurality of areas on the recording medium, whose positions in the intersecting direction are different;

a plurality of processing units configured to parallelly execute processes of generating recording image data to be used for driving the plurality of recording devices in the recording head;

a divided area determination unit configured to determine, based on the sequence information generated by the generation unit, by dividing a recording area on the recording medium on which the recording head performs recording, divided areas respectively corresponding to the plurality of processing units so that the plurality of processing units perform the processes corresponding to the divided areas wherein the divided area determination unit determines the divided areas so that the area recorded by one scanning motion is divided, along the direction of the scanning motion, into areas the number of which corresponds to the number of processing units;

a distribution unit configured to cause each of the plurality of processing units to generate recording image data by distributing, to the plurality of processing units, data corresponding to the divided areas determined by the divided area determination unit in the image data to be printed; and a recording unit configured to perform recording by controlling driving of the recording head based on the recording image data obtained by the plurality of processing units.

2. The apparatus according to claim 1, wherein the generation unit generates, for each scanning motion, information indicating positions of two ends of a range in the direction of the scanning motion as the sequence information, in which a significant dot is recorded by driving the recording head.

3. The apparatus according to claim 2, wherein the divided area determination unit includes a counter configured to count a number of pixels of the area recorded by one scanning motion of the recording head, and the divided area determination unit determines, for the plurality of processing units, the divided areas so that the area recorded by one scanning motion is set as a unit and a difference in number of pixels to be processed becomes minimum.

4. The apparatus according to claim 2, wherein the divided area determination unit accumulates the number of pixels recorded by one scanning motion of the recording head, and when a preset threshold is reached by accumulating the number of pixels recorded by a scanning motion of interest, the divided area determination unit determines areas from a scanning motion in which the accumulation has started to the scanning motion of interest as divided areas to be assigned to one processing unit, and resets the accumulation at the time of recording of the scanning motion of interest to determine divided areas to be assigned to a next processing unit.

5. The apparatus according to claim 1, wherein the generation unit generates information indicating a conveyance amount of the recording medium in addition to the moving range of each scanning motion of the recording head.

6. The apparatus according to claim 1, wherein each of the plurality of processing units converts provided image data into a recording color space, and performs quantization processing.

7. The apparatus according to claim 1, further comprising:
a reception unit configured to receive a print job containing encoded image data from an external apparatus; and
a decoding unit configured to decode the encoded image data received by the reception unit,
wherein the generation unit generates the sequence information by analyzing an image obtained by decoding the encoded image data by the decoding unit.

8. The apparatus according to claim 1, wherein the plurality of processing units comprise ASICs.

9. A control method for an image recording apparatus which includes a plurality of processing units configured to parallelly execute processes of generating recording image data to be used for driving a plurality of recording devices in a recording head, and prints an image on a recording medium by performing a scanning motion of the recording head in which the plurality of recording devices are arrayed, and relatively conveying the recording medium in accordance with the scanning motion in a direction intersecting a direction of the scanning motion, the method comprising:

generating, based on image data to be printed, sequence information indicating a moving range of each scanning motion of the recording head for each of a plurality of areas on the recording medium, whose positions in the intersecting direction are different;

determining, based on the generated sequence information, by dividing a recording area on the recording medium on which the recording head performs recording, divided areas respectively corresponding to the plurality of processing units so that the plurality of processing units perform the processes corresponding to the divided areas, wherein the divided areas are determined so that the area recorded by one scanning motion is divided, along the direction of the scanning motion, into areas the number of which corresponds to the number of processing units;

causing each of the plurality of processing units to generate recording image data by distributing, to the plurality of processing units, data corresponding to the determined divided areas in the image data to be printed; and performing recording by controlling driving of the recording head based on the recording image data obtained by the plurality of processing units.

10. The method according to claim 9, wherein in the generating, information indicating positions of two ends of a range in the direction of the scanning motion as the sequence information, in which a significant dot is recorded by driving the recording head, is generated for each scanning motion.

11. The method according to claim 10, wherein the determining includes counting the number of pixels of the area recorded by one scanning motion of the recording head, and in the determining, the divided areas are determined for the plurality of processing units so that the area recorded by one scanning motion is set as a unit and a difference in number of pixels to be processed becomes minimum.

12. The method according to claim 10, wherein in the determining,
the number of pixels recorded by one scanning motion of the recording head is accumulated, and when a preset threshold is reached by accumulating the number of pixels recorded by a scanning motion of interest, areas from a scanning motion in which the accumulation has started to the scanning motion of interest are determined as divided areas to be assigned to one processing unit, and the accumulation is reset at the time of recording of the scanning motion of interest to determine divided areas to be assigned to a next processing unit.

13. An image recording apparatus for printing an image on a recording medium by performing a scanning motion of a recording head in which a plurality of recording devices are arrayed, and relatively conveying the recording medium in accordance with the scanning motion in a direction intersecting a direction of the scanning motion, the apparatus comprising:

a generation unit configured to generate, based on image data to be printed, sequence information indicating a moving range of each scanning motion of the recording head for each of a plurality of areas on the recording medium, whose positions in the intersecting direction are different;

a plurality of processing units configured to parallelly execute processes of generating recording image data to be used for driving the plurality of recording devices in the recording head;

a divided area determination unit configured to determine, based on the sequence information generated by the generation unit, by dividing a recording area on the recording medium on which the recording head performs recording, divided areas respectively corresponding to the plurality of processing units so that the plurality of processing units perform the processes corresponding to the separate divided areas, wherein the divided area determination unit determines the divided areas so that the area recorded by one scanning motion is divided, along the intersecting direction, into areas the number of which corresponds to the number of processing units;

a distribution unit configured to cause each of the plurality of processing units to generate recording image data by distributing, to the plurality of processing units, data corresponding to the divided areas determined by the divided area determination unit in the image data to be printed; and a recording unit configured to perform recording by controlling driving of the recording head based on the recording image data obtained by the plurality of processing units.

14. The apparatus according to claim 13, wherein the generation unit generates, for each scanning motion, information indicating positions of two ends of a range in the direction of the scanning motion as the sequence information, in which a significant dot is recorded by driving the recording head.

15. The apparatus according to claim 14, further comprising:

a multi-pass recording unit configured to record the same area of the recording medium by a plurality of scanning motions by conveying the recording medium by an amount smaller than a width recorded by one scanning motion of the recording head, wherein the generation unit generates the sequence information for an area of each pass recorded by the multi-pass recording unit.

16. The apparatus according to claim 13, wherein the divided area determination unit divides the area so that the divided areas have the same size.

17. An image recording apparatus for printing an image on a recording medium by performing a scanning motion of a recording head in which a plurality of recording devices are arrayed, and relatively conveying the recording medium in accordance with the scanning motion in a direction intersecting a direction of the scanning motion, the apparatus comprising:

a generation unit configured to generate, based on image data to be printed, sequence information indicating a moving range of each scanning motion of the recording head for each of a plurality of areas on the recording medium, whose positions in the intersecting direction are different;

a plurality of processing units configured to parallelly execute processes of generating recording image data to be used for driving the plurality of recording devices in the recording head;

a divided area determination unit configured to determine, based on the sequence information generated by the generation unit, by dividing a recording area on the recording medium on which the recording head performs recording, divided areas respectively corresponding to the plurality of processing units so that the plurality of processing units perform the processes corresponding to the separate divided areas, the divided area for which one processing unit process and another divided area for which another processing unit process being adjacent and not overlapping from each other;

a distribution unit configured to cause each of the plurality of processing units to generate recording image data by distributing, to the plurality of processing units, data corresponding to the divided areas determined by the divided area determination unit in the image data to be printed; and a recording unit configured to perform recording by controlling driving of the recording head based on the recording image data obtained by the plurality of processing units.

* * * * *